United States Patent

Hanafusa et al.

[11] Patent Number: 5,984,336
[45] Date of Patent: Nov. 16, 1999

[54] FRAME STRUCTURE FOR A MOTORCYCLE

[75] Inventors: Seiji Hanafusa; Hitoshi Suzuki, both of Saitama, Japan

[73] Assignee: Honda Giken Kogyo Kabushiki Kaisha, Tokyo, Japan

[21] Appl. No.: 08/995,008

[22] Filed: Dec. 19, 1997

[30] Foreign Application Priority Data

Dec. 20, 1996 [JP] Japan .................................. 8-341855

[51] Int. Cl.$^6$ ...................................................... B62K 3/04
[52] U.S. Cl. .......................................... 280/281.1; 180/227
[58] Field of Search .................................. 180/219, 227; 280/281.1

[56] References Cited

U.S. PATENT DOCUMENTS

| | | | |
|---|---|---|---|
| 3,508,765 | 4/1970 | Bauer et al. | 280/281 |
| 4,809,999 | 3/1989 | Tozawa et al. | 280/281.1 |
| 5,353,888 | 10/1994 | Tsukahara | 180/219 |
| 5,377,776 | 1/1995 | Saiki | 180/219 |
| 5,480,001 | 1/1996 | Hara | 180/227 |

FOREIGN PATENT DOCUMENTS 71747  11/1992  Japan .

*Primary Examiner*—Robert J. Oberleitner
*Assistant Examiner*—Daniel Yeagley
*Attorney, Agent, or Firm*—Birch, Stewart, Kolasch & Birch, LLP

[57] ABSTRACT

Seat rails and pivot frames are easily attached to a main frame of a motorcycle. Pivot frames and seat rails are connected to the sides of a rear end portion of a main frame in the form of a round pipe. Upper ends of the pivot frames and front ends of the seat rails are held against the sides of the rear end portion of the main frame such that their attachment axes L1, L2 are substantially aligned with an axis L0 of the main frame and the upper ends and the front ends are staggered longitudinally in an overlapping relationship as viewed in a side elevation. The upper ends and the front ends are then welded to the main frame along continuous welding lines.

14 Claims, 5 Drawing Sheets

FRAME STRUCTURE FOR A MOTORCYCLE

BACKGROUND OF THE INVENTION

1. Field of the Invention

The present invention relates to a frame structure suitable for use in a motorcycle or similar vehicle.

2. Description of Background Art

One conventional frame structure which is suitable for a motorcycle is disclosed in Japanese patent publication No. 4-71747 and includes a main frame in the form of a round pipe extending rearwardly from a head pipe on which a front wheel is steerably supported. A pivot frame is provided which includes an upper end welded to a side of a rear end of the main frame and extends downwardly. A seat rail includes a front end welded to a side of the rear end of the main frame and extends rearwardly. The upper end of the pivot frame has an axis extending vertically and crossing the axis of the main frame and the axis of the front end of the seat rail.

The pivot frame and the seat rails are formed of round pipes. The pivot frame has an intermediate pivot to which the front end of a rear arm is attached by a shaft, with a rear wheel supported on the rear end of the rear arm. A seat is supported on the seat rail.

Because the axis of the pivot frame at its attachment region crosses the axis of the main frame, the pivot frame and the seat rail are welded in different directions, respectively. Since the pivot frame and the seat rail need to be installed by the use of different welding processes, the entire welding operation is complex and carried out in a large number of steps, and cannot easily be automated.

Inasmuch as the pivot frame and the seat rail are welded separately from each other, different accuracy levels of the respective welding processes tend to greatly affect the overall welding accuracy.

The main frame in the form of a round pipe makes it difficult to fabricate an abutment structure of the upper end of the pivot frame due to the accuracy requirement for a cut edge thereof. Furthermore, it is difficult to weld the pivot frame to the main frame because the pivot frame needs to be welded along a three-dimensional line in the circumferential direction of the main frame. The welding line cannot sufficiently be increased even though increasing the welding line is desirable for increasing the welding strength.

SUMMARY AND OBJECTS OF THE INVENTION

To solve the above problems, there is provided in accordance with the present invention a frame structure for a motorcycle having a main frame extending rearwardly from a head pipe on which a front wheel is steerably supported. A pivot frame includes an upper end welded to a side of a rear end of the main frame and extends downwardly. The pivot frame supports a pivot of a rear arm on which a rear wheel is swingably supported. A seat rail includes a front end welded to a side of the rear end of the main frame and extends rearwardly. The seat rail supports a seat on an upper surface thereof. At least one of the upper end of the pivot frame and the front end of the seat rail is bent such that both of the ends extend in the same direction as each other and are arranged in line with each other.

The main frame may include a round pipe, and the upper end of the pivot frame and the front end of the seat rail may be staggered longitudinally substantially along the axis of the main frame.

At least one of the upper ends of the pivot frame and the front end of the seat rail is bent such that both of the ends extend in the same direction as each other and are arranged in line with each other. Therefore, the portions of the pivot frame and the seat rail, which are welded to the main frame, are positioned on a single continuous welding line.

Consequently, since the upper end of the pivot frame and the front end of the seat rail can be welded along a single continuous welding line, they can be welded with increased accuracy in a reduced number of steps. In addition, the welding process can easily be automated.

If the main frame includes a round pipe, and the upper end of the pivot frame and the front end of the seat rail are staggered longitudinally substantially along the axis of the main frame, then the upper end of the pivot frame and the front end of the seat rail can be welded along a straight welding line substantially along the axis of the main frame.

Since the welding process can be effected along a straight line substantially parallel to the axis of the main frame, the upper end of the pivot frame and the front end of the seat rail can be easily and accurately welded to the main frame even though the main frame includes a round pipe. Furthermore, the upper end of the pivot frame and the front end of the seat rail, which serve as joints to the main frame, may be simplified in shape.

In addition, the upper end of the pivot frame and the front end of the seat rail may be welded along sufficient welding lines, respectively, and hence have sufficient levels of welding strength.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 2:
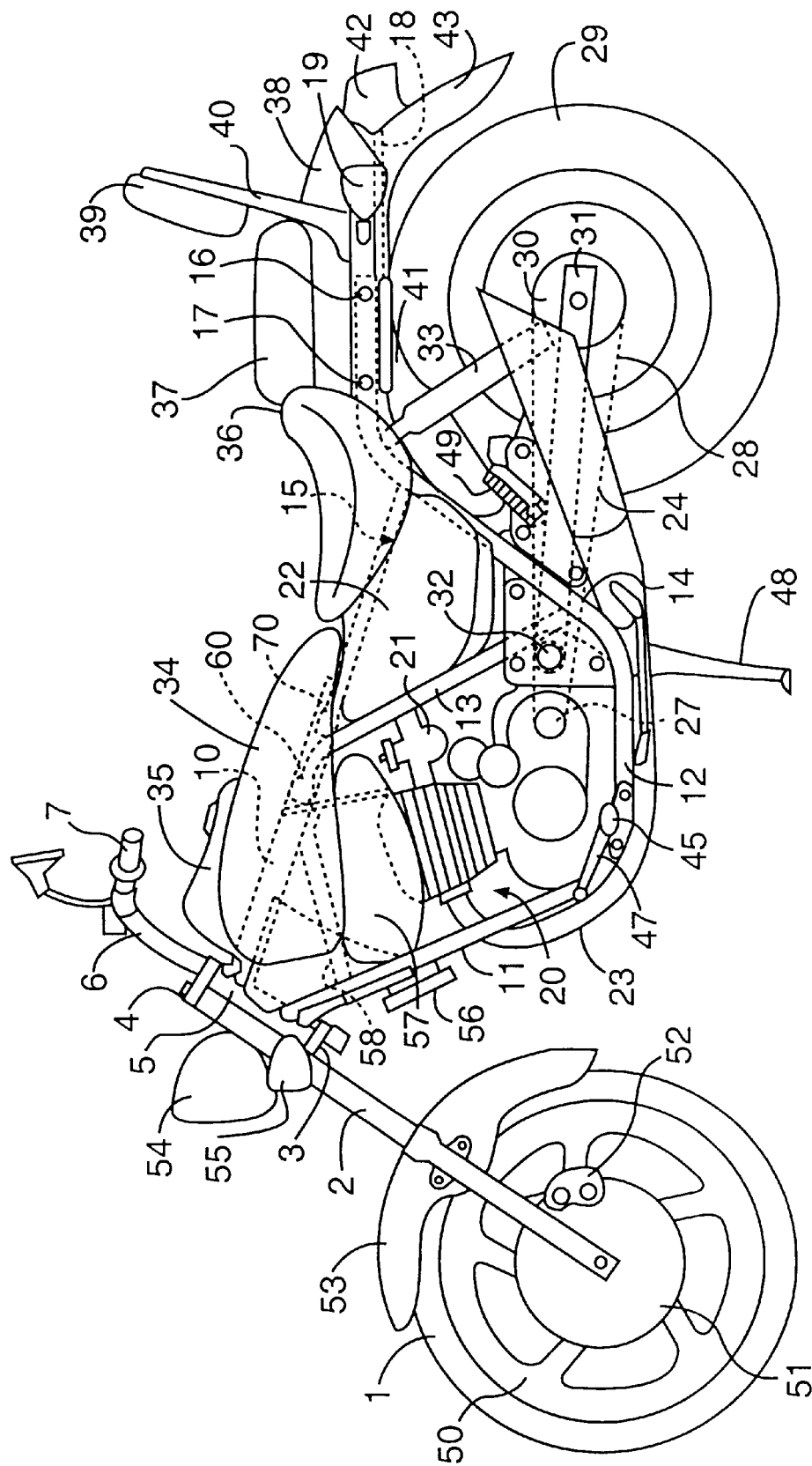
FIG. 2 is a left-hand side elevational view of the motorcycle.
Figure 3:
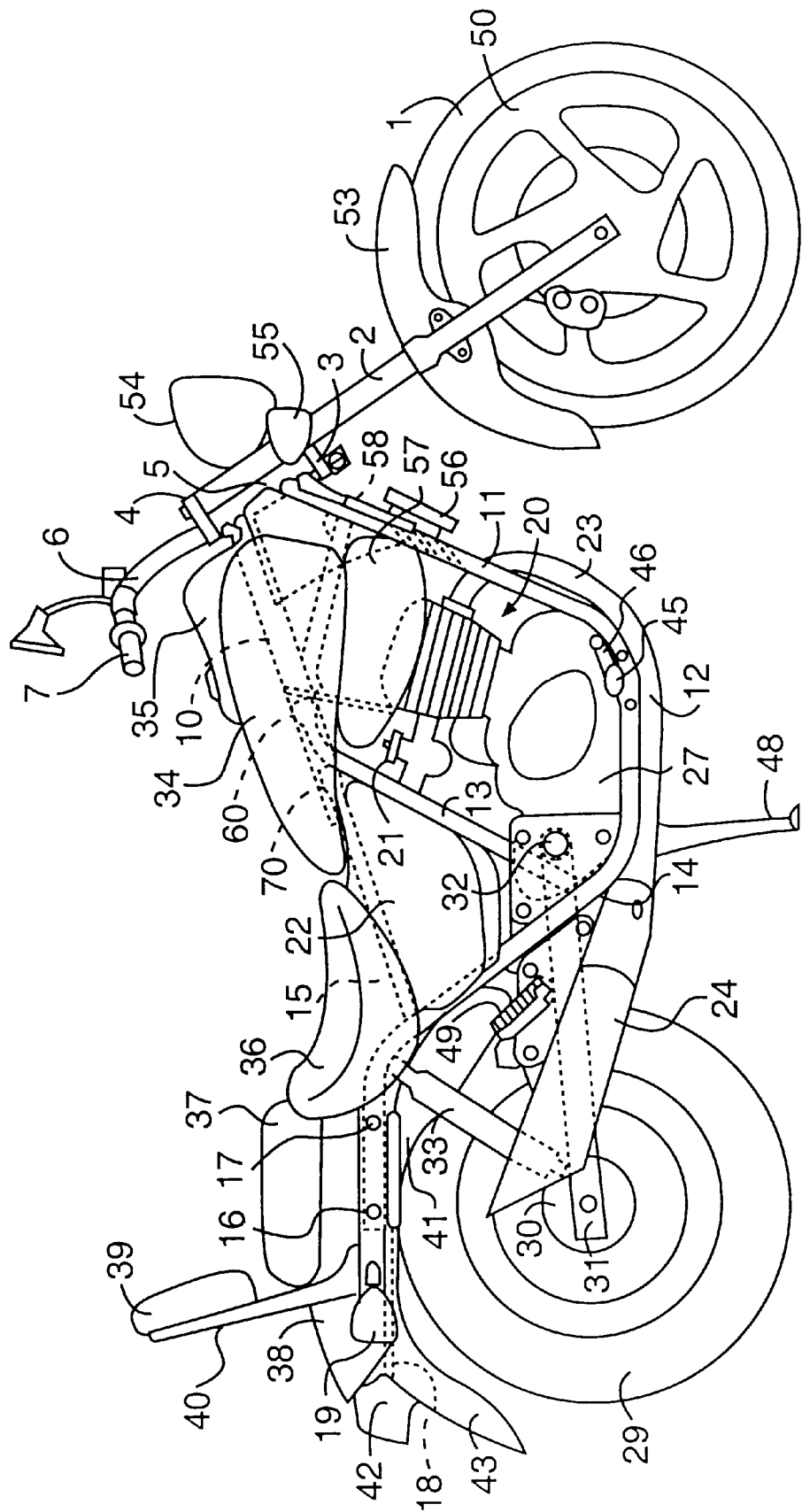
FIG. 3 is a right-hand side elevational view of the motorcycle.
Figure 4:
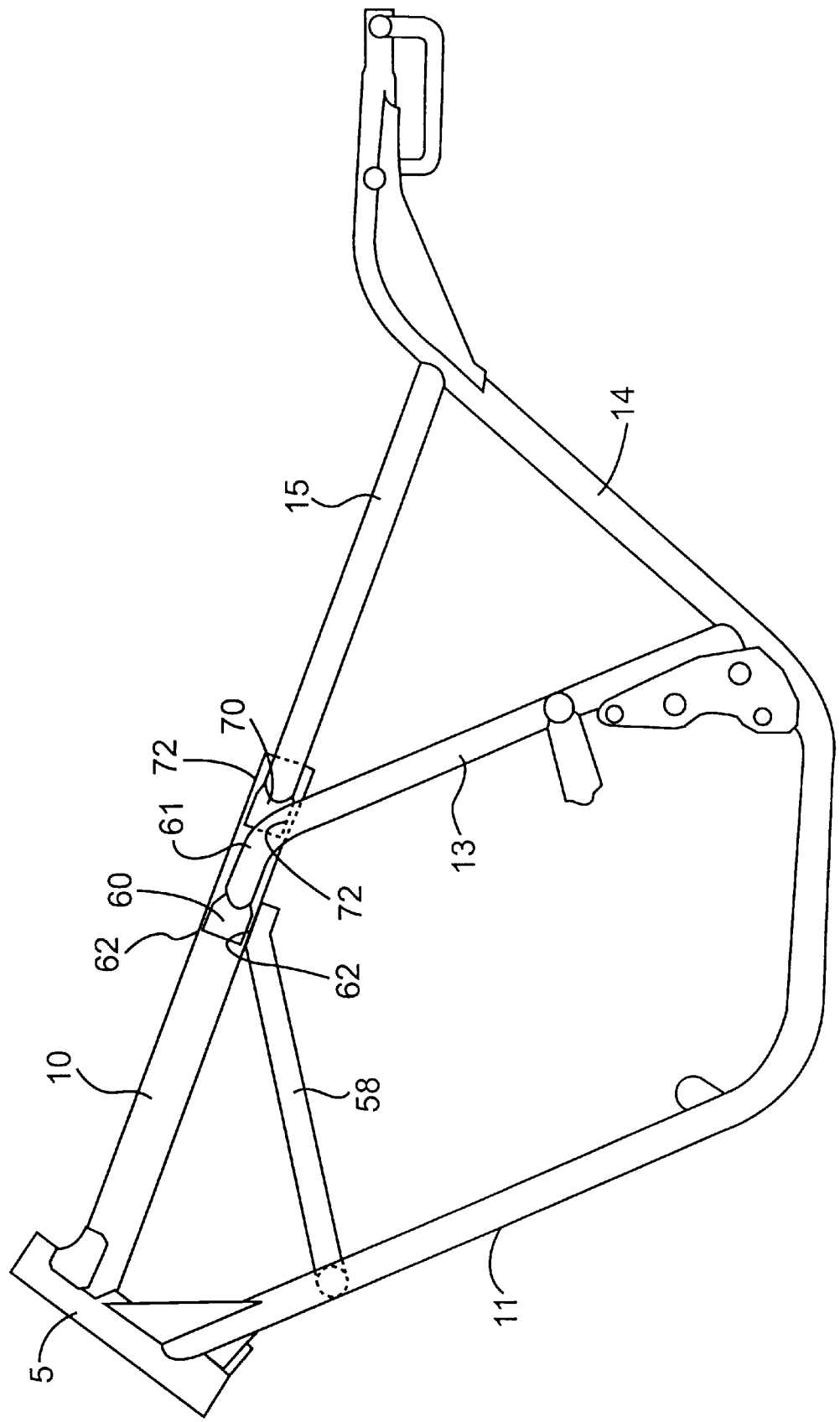
FIG. 4 is an enlarged side elevational view of a portion of the motorcycle.
Figure 5:
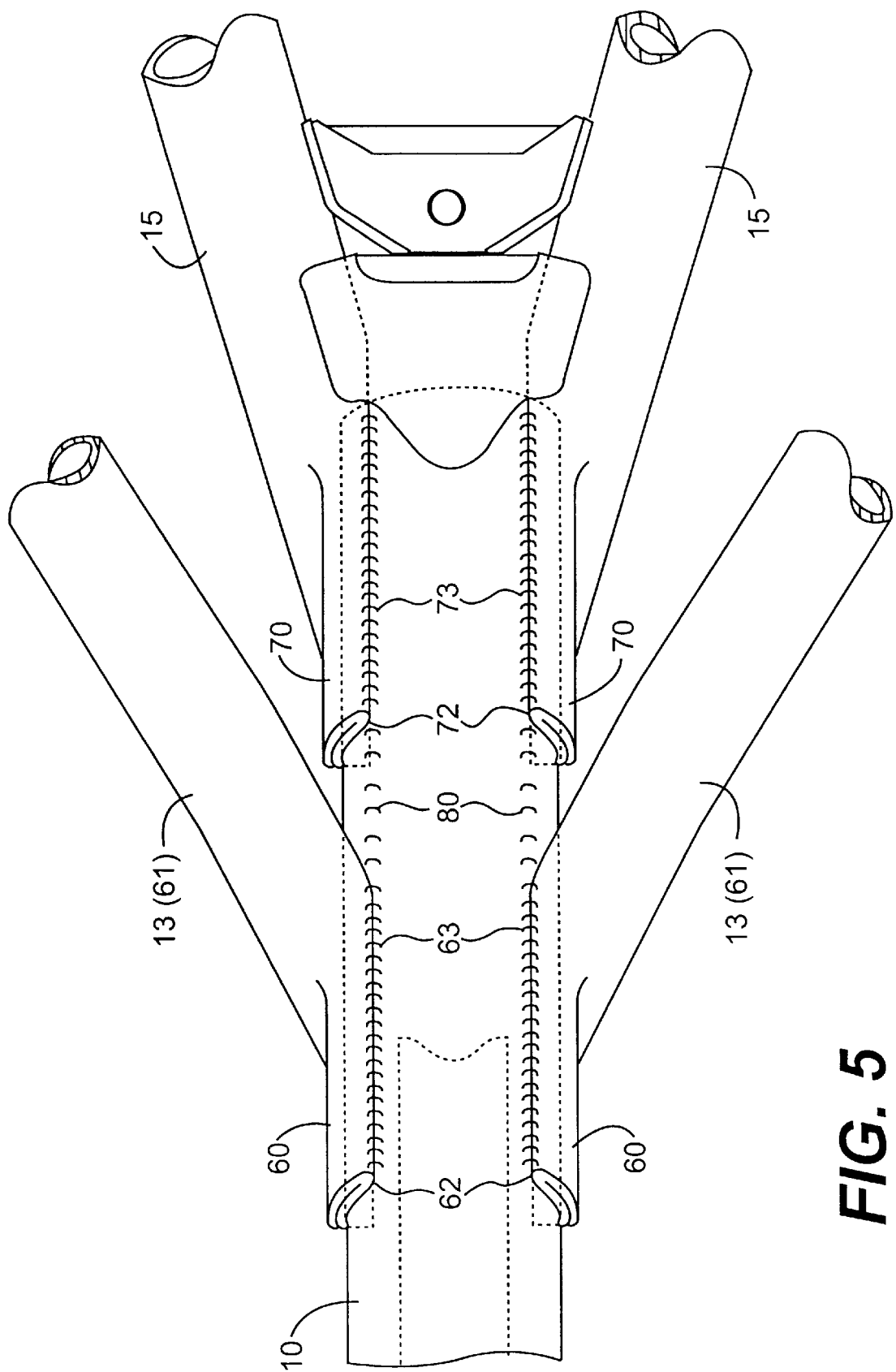
FIG. 5 is an enlarged fragmentary plan view of a main frame portion.

An embodiment of the present invention, constructed as a customized motorcycle, will be described below with reference to the drawings. As shown in FIGS. 2 and 3, the motorcycle includes a front fork 2 which supports a front wheel 1 and has an upper portion angularly movably supported on a head pipe 5 by a bottom bridge 3 and a top bridge 4. A handlebar 6 is attached to and extends from the top bridge 4, and has grips 7 positioned rearwardly.

The head pipe 5 is mounted on a front end of a main frame 10, which extends longitudinally along the center of the motorcycle. A pair of laterally spaced down frames 11 extend obliquely downwardly laterally from a lower portion of the head pipe 5. The down frames 11 have respective lower ends contiguous to a lower frame 12 that extends longitudinally substantially horizontally.

A pair of laterally spaced pivot frames 13 extend downwardly from a rear end of the main frame 10 substantially parallel to the down frames 11 as viewed in side elevation. The pivot frames 13 have respective lower ends connected to lower portions of a pair of laterally spaced rear stays 14 extending obliquely upwardly and rearwardly contiguously from a rear end of the lower frame 12.

A pair of laterally spaced seat rails 15 extend substantially horizontally rearwardly from the rear end of the main frame 10. The seat rails 15 have respective rear ends joined to respective upper portions of the rear stays 14.

The rear stays 14 are bent in the vicinity of the joined ends of the seat rails 15 and extend substantially horizontally rearwardly. The rear stays 14 have outer side surfaces covered with grab rails 16 mounted in place by attachments 17. The rear stays 14 have respective rear ends connected to a pair of laterally spaced auxiliary frames 18 extending rearwardly in the direction in which the rear stays 14 extend. Rear flashing indicators 19 are supported on the rear ends of the rear stays 14.

The main frame 10, the down frames 11, the lower frame 12, the pivot frames 13, the seat rails 15, and the rear stays 14 jointly make up a motorcycle frame. The main frame 10, the down frames 11, the lower frame 12, and the seat rails 15, which serve as a front portion of the motorcycle frame, provide a cradle-shaped frame structure by which an engine 20 is supported. The engine 20 draws air from an air cleaner in a side cover 22 through a carburetor 21, and discharges exhaust gases through an exhaust pipe 23 and mufflers 24.

The engine 20 has a crankcase on which a starter motor is mounted. The engine 20 drives a sprocket 30 coaxially positioned with respect to a rear wheel 29 through a drive gear 27 and a chain 28.

The rear wheel 29 is supported on rear ends of rear arms 31 whose front ends are vertically swingably mounted by a shaft to a pivot 32 on intermediate portions of the pivot frames 13. Dampers 33 are connected between rear portions of the rear arms 31 and upper portions of the rear stays 14.

A fuel tank 34 is supported on the main frame 10 and supports on a front upper surface thereof. An indicator panel 35 includes various indicators and meters. A rider's seat 36 is supported on the seat rails 15 behind the fuel tank 34.

Behind the rider's seat 36, there is positioned a passenger seat 37 supported on a rear cowl 38. A backrest 39 is disposed behind the passenger seat 37 and is mounted on a support 40 attached to the grab rails 16.

A rear fender 41 is attached a lower portion of the rear cowl 38. A tail light 42 and a mudguard 43 are mounted on a rear end of the rear fender 41 and are supported on the auxiliary frames 18.

Front steps 45, a brake pedal 46, and a shift pedal 47 are positioned forwardly of a lower portion of the engine 20 so that the rider of the motorcycle can extend his/her legs forwardly in a customary motorcycle riding fashion.

The motorcycle also has a side stand 48, rear steps 49, a wheel 50 of light alloy or the like, brake disks 51, brake calipers 52, a front fender 53, a head light 54, front flashing indicators 55, a horn 56, front side covers 57 laterally covering an upper portion of the cylinder of the engine 20, and reinforcing pipes 58.

Details of the frame structure will be described below. As shown in FIGS. 1 through 5, each of the pivot frames 13 include a round pipe, and a bent end portion 61 bent forwardly and having a semicircular flattened upper end 60.

The pivot frames 13 have an attachment axis L1 near the upper ends 60 that is in substantial agreement with an axis L0 of the main frame 10 in the form of a round pipe. The upper ends 60 have upper and lower longer sides 62 held against and welded to the sides of the main frame 10 in a relatively long range along welding lines 63 that extend along the longer sides 62.

The seat rails 15 are attached in a manner similar to the pivot frames 13. The seat rails 15 include respective semicircular flattened front ends 70, and have an attachment axis L2 near the front ends 70 which is in substantial agreement with the axis L0 of the main frame 10.

The front ends 70 have upper and lower longer sides 72 held against and welded to the sides of the main frame 10 in a relatively long range along welding lines 73 that extend along the longer sides 72.

The welding lines 63, 73 are positioned continuously in line with each other in a sandwiched relationship to the welding lines 80 formed along an intermediate non-welding region. The welding lines 63, 73 and 80 are continuously formed substantially in one process.

As shown in FIGS. 2 and 3, the upper ends 60 and the bent end portions 61 of the pivot frames 13 and the front ends 70 of the seat rails 15 are positioned in partially overlapping relationship and are staggered longitudinally.

Figure 1:
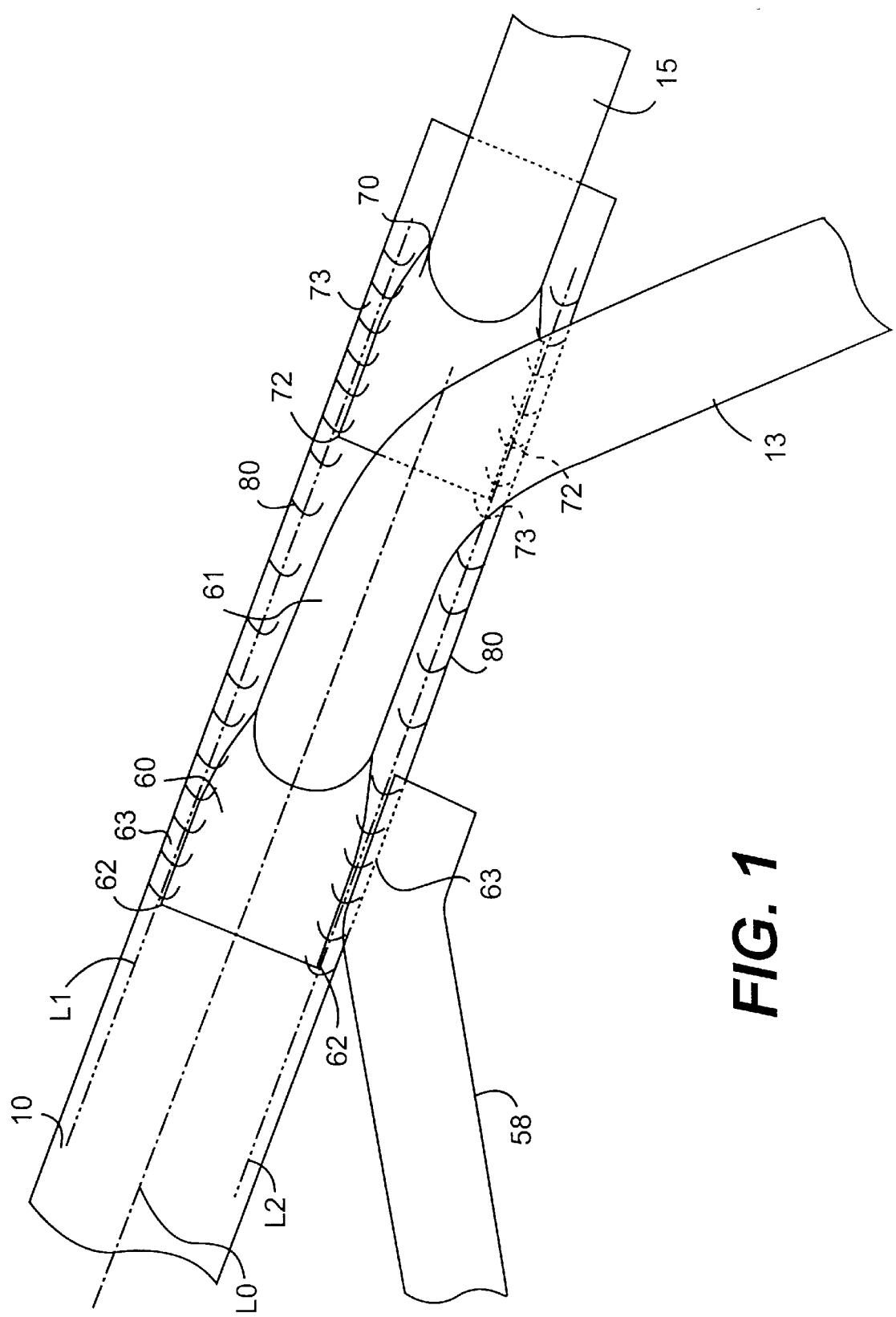
FIG. 1 is an enlarged fragmentary side elevational view of a frame of a motorcycle.

A process of assembling the frame structure and the advantages thereof will be described below. As shown in FIGS. 1 through 3, since the attachment axes L1, L2 lie substantially parallel to the axis L0 of the main frame 10, the longer sides 62, 72 are held in contact with the sides of the main frame 10 along long ranges.

When the upper ends 60 and the bent end portions 61 of the pivot frames 13 and the front ends 70 of the seat rails 15 are welded to the main frame 10, they are welded along the welding lines 63, 73 which are relatively long.

Therefore, the pivot frames 13 and the seat rails 15 are secured to the sides of the main frame 10 with sufficient welding strength.

Because the upper ends 60 and the front ends 70 are staggered longitudinally in an overlapping relationship as viewed in the side elevation, the welding lines 63, 73 are arranged in line with each other, forming single continuous welding lines together with the welding lines 80, as shown in FIG. 1.

Therefore, the upper ends 60 of the pivot frames 13 and the front ends 70 of the seat rails 15 can be welded in a single welding process for each of the upper and lower portions thereof. Thus, the welding process can be carried out in a reduced number of steps and can be automated.

In addition, inasmuch as the upper ends 60 of the pivot frames 13 and the front ends 70 of the seat rails 15 are simultaneously welded, the overall welding accuracy does not depend on the welding accuracy of each of the pivot frames 13 and the seat rails 15, resulting in a welded structure with an excellent welding failure absorption capability.

Even though the main frame 10 comprises a round pipe, since the upper ends 60 of the pivot frames 13 and the front ends 70 of the seat rails 15 are staggered longitudinally substantially along the axis LO of the main frame 10, they can be welded to the main frame 10 along straight welding lines which extend substantially along the axis LO of the main frame 10.

Because the welding process is carried out on straight lines which extend substantially along the axis LO of the main frame 10, the upper ends 60 of the pivot frames 13 and the front ends 70 of the seat rails 15 can easily and accurately be welded to the main pipe 10 even though the main pipe includes a round pipe. Moreover, the upper ends 60 of the pivot frames 13 and the front ends 70 of the seat rails 15 serve as joints to the main frame 10 and may be of a relatively simple shape.

Additionally, the welding lines at the upper ends 60 of the pivot frames 13 and the front ends 70 of the seat rails 15 can be sufficiently long for sufficient welding strength.

It is to be understood that it is not necessary to form the welding lines 80 in the intermediate non-welding region. The pivot frames 13 and the seat rails 15 may be welded while skipping the welding lines 80. However, forming the welding lines 80 facilitates the welding process.

In addition, it is not necessary to form the main frame 10 in the shape of a round pipe. The main frame 10 may be a cast member having a rectangular cross section or the like at least in its rear portion. With such a modification, the upper ends 60 of the pivot frames 13 and the front ends 70 of the seat rails 15 may not necessarily be staggered in the longitudinal direction. Instead, the upper ends 60 of the pivot frames 13 and the front ends 70 of the seat rails 15 may be staggered obliquely vertically, and the front ends 70 of the seat rails 15 may be bent largely in the vertical direction in line with the upper ends 60 of the pivot frames 13.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A frame structure for a motorcycle comprising:
    a head pipe;
    a main frame extending rearwardly from said head pipe;
    a pivot frame having an upper end welded to a side of a rear end of the main frame and extending downwardly, said pivot frame supporting a pivot of a rear arm on which a rear wheel is swingably supported; and
    a seat rail having a front end welded to a side of the rear end of the main frame and extending rearwardly, said seat rail supporting a seat on an upper surface thereof;
    at least one of the upper end of the pivot frame and the front end of the seat rail being bent, both the upper end and the front end extend in the same direction as each other and are arranged in line with each other, wherein said upper end and front end have a flattened surface having a top and bottom side, said top side of the upper and front ends being positioned along a line extending longitudinally in relation to said main frame and said bottom side of the upper and front ends being positioned along another line extending longitudinally in relation to said main frame.

2. The frame structure for a motorcycle according to claim 1, wherein said main frame includes a round pipe, and the upper end of the pivot frame and the front end of the seat rail are staggered longitudinally substantially along an axis of the main frame.

3. The frame structure for a motorcycle according to claim 1, wherein the flattened bent portion of said upper end of said pivot frame is curved for mounting adjacent to said main frame, said bent portion being welded to said main frame for securing said upper end of said pivot frame thereto.

4. The frame structure for a motorcycle according to claim 3, wherein said flattened bent portion includes a semicircular portion for abutting adjacent to said main frame for enabling said upper end to be welded to said main frame for securing said upper end of said pivot frame thereto.

5. The frame structure for a motorcycle according to claim 1, wherein the flattened bent portion of the front end of said seat rail is curved for mounting adjacent to said main frame, said bent portion being welded to said main frame for securing said front end of said seat rail thereto.

6. The frame structure for a motorcycle according to claim 5, wherein said flattened bent portion of the front end of said seat rail includes a semicircular portion for abutting adjacent to said main frame for enabling said front end to be welded to said main frame for securing said front end of said seat rail thereto.

7. The frame structure for a motorcycle according to claim 1, wherein placement of said upper end and said front end of said pivot frame and said seat rail allow said upper end and said front end to be welded along at least one line extending longitudinally along said main frame.

8. A frame structure for a motorcycle comprising:
    a head pipe;
    a main frame having a first end adapted to be connected to said head pipe and a distal end extending from said head pipe;
    a pivot frame having a first end being bent and adapted to be connected along a predetermined portion of said distal end of said main frame and a distal end extending downwardly therefrom; and
    a seat rail having a first end being bent and adapted to be connected along a predetermined portion of said distal end of said main frame and a distal end extending rearwardly therefrom;
    said bent portion of said first end of the pivot frame and the bent portion of the first end of the seat rail extend in a predetermined direction and are arranged in line with each other for mounting relative to said distal end of said main frame, wherein said first end of said pivot frame and said first end of seat rail are flattened, said flattened ends each having a top side and a bottom side, said top side of said first end of said pivot frame and said top side of said first end of said seat rail being positioned along a line extending longitudinally in a length direction of said main frame and said bottom side of said first end of said pivot frame and said bottom side of said first end of said seat rail being positioned along another line extending longitudinally in a length direction of said main frame.

9. The frame structure for a motorcycle according to claim 8, wherein said main frame is a round pipe, and the flattened bent first end of the pivot frame and the flattened bent first end of the seat rail are staggered longitudinally substantially along an axis of the distal end of the main frame.

10. The frame structure for a motorcycle according to claim 8, wherein the flattened bent portion of said first end of said pivot frame is curved for mounting adjacent to said main frame, said flattened bent portion is welded to said main frame for securing said first end of said pivot frame thereto.

11. The frame structure for a motorcycle according to claim 10, wherein the flattened bent portion includes a semicircular portion for abutting adjacent to said main frame for enabling said first end to be welded to said main frame for securing said first end of said pivot frame thereto.

12. The frame structure for a motorcycle according to claim 8, wherein the flattened bent portion of the first end of said seat rail is curved for mounting adjacent to said main frame, said flattened bent portion is welded to said main frame for securing said first end of said seat rail thereto.

13. The frame structure for a motorcycle according to claim 12, wherein the flattened bent portion of the first end of said seat rail includes a semicircular portion for abutting adjacent to said main frame for enabling said first end to be welded to said main frame for securing said first end of said seat rail thereto.

14. The frame structure for a motorcycle according to claim 8, wherein placement of said first end of said pivot frame and said seat rail allow said first end of said pivot frame end said seat rail to be welded along at least one line extending longitudinally along said main frame.

* * * * *